3,468,886
TETRAHYDROHOMOFOLIC ACID SULFATE AND SYNTHESIS THEREOF
Carol W. Mosher, Zurich, Switzerland, and Edward M. Acton and Leon Goodman, Menlo Park, Calif., assignors to the United States of America as represented by the Secretary of Health, Education, and Welfare
No Drawing. Filed Oct. 23, 1967, Ser. No. 680,296
Int. Cl. C07d 57/30; A61k 27/00
U.S. Cl. 260—251.5         1 Claim

ABSTRACT OF THE DISCLOSURE

The present invention relates to a novel folic acid antagonist which is a reduced form of the next upward homolog of folic acid. The present compound, uniquely as compared with known compounds, has sufficient stability to permit utilization of these qualities. Alternatively, it may be stated to be a compound related to folic acid but possessing an additional methylene group between positions 9 and 10 of the folic acid molecule and in its reduced form can be designated as homofolic-$H_4$ sulfate. It is a potent inhibitor, in vitro, of thymidylate synthetase.

The tetrahydrohomofolic acid sulfate is prepared according to the present invention from a known material, homofolic acid. The acid is hydrogenated using preferably a prereduced platinum or palladium catalyst in acid pH using a halogenated carboxylic acid such as trifluoroacetic acid in a hydrogen atmosphere at ambient temperature until two moles of hydrogen are absorbed for about one mole of the acid starting material. The catalyst is removed by filtration through Celite in an inert atmosphere ($N_2$) and the sulfate salt of tetrahydrohomofolic acid is formed by reacting the reduced free acid with alcoholic sulfuric acid. The resulting precipitate is separated and purified, preferably with ether and multiple centrifugation.

The product may be stored in a stoppered bottle at room temperature and, happily, in contrast to previous salts, is stable for 30 to 60 days. It is believed that the stability of this sulfate salt is caused by its linkage to the nitrogen in the 5 or 8 position of the pteridine moiety.

FIELD OF INVENTION

The present compound consists of a pteroyl fraction joined to a glutamate residue through a methylene bridge. Alternatively, the structure may be viewed from left to right as a 7-amino, 4-hydroxy pteridine fraction, a paraminobenzoic acid fraction and a glutamate fraction. The next lower homolog is folic acid, a well known growth accelerator. The present compounds differ sharply from the corresponding folic acid homologs in that they are growth inhibitors of such microorganisms as *Streptococcus faecalis* and *Lactobacillus casei*. In the patent art related compounds in the folic acid series assigned to American Cyanamid are described in the following: 2,269,627 — Consulich, 2,737,514 — Roth, 2,729,641 — Rockman et al., 2,737,515—Rockman et al.

Tetrahydrohomofolic acid is a known compound and is described in Mead et al., Cancer Research, 26, 2374 (1966), and Goodman et al., J.A.C.S., 86, 308 (1964).

The Mead article describes, at page 2374, the preparation of the unstable potassium salt, and Kisliuk et al. in Science 156, 1616–17, of June 23, 1967, teaches preparation of the related alkali metal sodium salt.

PHARMACOLOGICAL ACTIVITY

The tetrahydrohomofolate (THHF) compounds of which the present sulfate is a member show pharmacological activity and utility in animals as antifolic compounds effective in pyrimethamine resistant malaria in monkeys and showing non-toxic and anti-tumor activity against amethopterin resistant L1210. Mead above, also discovered that the analogous tetrahydrohomopteroate (THHP), a contaminant in the present tetrahydrohomofolate compounds, showed greater antimalarial activity in animal testing but the present THHF showed superior amelioration of leukekopenia and activity as an antileukemic and folic acid antagonist (Kisliuk et al., Fed. Proc., vol. 26, page 783 (2936) (1967).

THEORETICAL BASIS FOR THE ACTIVITY OF THE COMPOUNDS

Since the tetrahydrohomofolates inhibit hematoptoiesis in monkeys by inhibition of appetite loss, diarrhea, decrease in urine volume and rise in blood urea nitrogen, the observed effects plus the structure of the present compound led to a conclusion that they were effective in blocking folic acid metabolism. Further, the homofolic derivatives have been found to be powerful growth inhibitors in amethopterin resistant systems such as *Streptococcus faecalis* and the inhibition of *E. coli* thymidylate synthetase.

The moderate antimalarial activity of the thymidylate of the tetrahydrohomofolates are believed to achieve this activity due to the presence in the molecule of a p-aminobenzoic acid moiety. It is noted that sulfonamides are believed to have antimalarial activity because they inhibit the incorporation of p-aminobenzoic acid into the dihydrofolic acid molecule. It is theorized that tetrahydrohomofolates act at the same site as the sulfonamides.

PROCESS AND RESULTING SULFATE

The known material homofolic acid, the next adjacent upward homolog to folic acid, is reduced by the addition of two moles of hydrogen in acid medium employing a halogenated carboxylic acid such as $CF_3COOH$ and a group 8 metal catalyst of the platinum-palladium-rhodium type (Pd, Pt, Rh). The reaction proceeds readily at ambient temperature to almost stoichiometric completion in about 4–6 hours at atmospheric pressure.

After filtration of tetrahydrohomofolic acid through Celite to remove the catalyst, the sulfate is prepared utilizing an equimolar quantity of sulfuric acid. The formation of the sulfate produces good yields in an operating time of about 3–5 hours at about 60° C. at reduced pressure (0.2 mm.).

IDENTIFICATION OF THE COMPOUND

The subject tetrahydrohomofolic acid sulfate prepared below in the examples and in other test runs, although far more stable than preceding compounds, was of sufficient fragility that M.P. data by known present laboratory methods was unfeasible. Fingerprint data was obtained by measurement of the hydrogen uptake proceeding from the starting material, homofolic acid, and measurement of the sulfate in the final carbon, hydrogen nitrogen, sulfur analysis. Aditionally, by ultra violet spectral data, it was known that the tetrahydrohomofolic acid and salts in a solution at pH 7, have a maximum near 295 m$\mu$. This was verified by the prior published experiments by Kisliuk et al. One test made of U.V. maximum (ultra violet spectra) at pH 7.2 in 0.2 molar mercaptoethanol, 0.1 molar tris HCl with optimum runs consistently showed the characteristic 295 m$\mu$ peak of the tetrahydrohomofolic structure.

The following examples illustrate the invention which is set out in the claims.

Example 1

In a 3-neck, standard taper round bottom flask (one neck closed with a glass stopper, one with a rubber serum cap, and the third connected to a buret to measure hydrogen uptake), 80 mg. of platinum oxide, suspended in 5 ml. trifluoroacetic acid, was prereduced under 1 atmosphere of hydrogen at room temperature stirring magnetically. A solution of 798 mg. (1.75 mm.) of homofolic acid in 5 ml. trifluoroacetic acid (warmed slightly to effect complete solution) in a syringe was injected through the rubber serum cap. After about an hour, the theoretical amount of hydrogen (85 ml. 3.50 mm.) had been absorbed, but reduction was continued for another 40 minutes, when the total hydrogen uptake was 100 ml. (4.1 mm.).

Catalyst was immediately removed by filtering the light brown reaction mixture through Celite, under nitrogen; the filtrate was collected in a flask containing about 1.8 mm. sulfuric acid in 4 ml. of ethanol (i.e., an aliquot of a mixture of 0.46 ml. of concd. $H_2SO_4$ and 20 ml. of ethanol). A small amount of precipitate was found; addition of 40 ml. of dry ether caused separation of a tan colored solid, which was separated by centrifugation. Decantation followed by trituration with fresh ether and centrifugation was repeated 6 times. (Collection of the product on a filter is inadvisable since the product is quite hygroscopic and becomes gummy.) The ether damp product was dried over phosphorus pentoxide several hours at room temperature (0.5 mm.) and then two hours at 100° C. The dried product, 775 mg. (78%) is stable when stored in a stoppered bottle at room temperature. (Ultraviolet spectra of samples thus stored for 45 days were essentially unchanged.)

*Analysis.*—Calc'd for $C_{20}H_{25}N_7O_6 \cdot 2H_2SO_4$: C, 41.1; H, 4.88; N, 17.6; S, 5.75. Calc'd for $C_{20}H_{25}N_7O_6 \cdot 1.3 H_2SO_4$: C, 41.1; H, 4.75; N, 16.8; S, 6.95. Found: C, 40.6; H, 5.05; N, 17.0; S, 6.88.

No special precautions were taken in running spectra, except that freshly prepared solutions were used for each curve.

U.V. spectra: ($\epsilon$ values calculated, assuming the product to contain $1.3H_2SO_4$ mol. wt. 586).

In 2 N HCl: $\lambda_{max(m\mu)}$ 227 (shoulder) ($\epsilon$ 13,900); 264 ($\epsilon$ 17,900)

In 0.1 N NaOH: $\lambda_{max(m\mu)}$ 283 ($\epsilon$ 17,500)

In 0.1 N acetic acid $$\lambda^{pH\ 3.4}_{max.\ (m\mu)}\ 267$$

($\epsilon$ 20,300); 294 (shoulder) ($\epsilon$ 9,250)

In 0.01 M tris buffer containing 0.1 M 2-mercaptoethanol:
Found:

$$\lambda^{pH\ 7}_{max.\ (m\mu)}\ 292$$

($\epsilon$ 20,300); when the solution stood overnight, the peak shifted to 297 ($\epsilon$ 17,000).

In this system, Kisliuk et al.
Found: $\lambda_{max(m\mu)}$ 295 ($\epsilon$ 20,000; 20,000; and 26,000)

Example 2

Tetrahydrohomofolic acid sulfate.—798 mg. (1.75 mm.) of homofolic acid was dissolved in 5 ml. $CF_3COOH$, with slight warming and added to a suspension of reduced $PtO_2$, 80 mg. in 5 ml. $CF_3COOH$. Theoretical uptake of $H_2$ was 85 ml. and the actual uptake of $H_2$ was 100.6 g. or about 2.4 mols $H_2$/mol of acid. The tetrahydrohomofolic acid was filtered through Celite into 4.3 ml. EtOH solution containing 1.8 mm. $H_2SO_4$. A small amount of ppt. resulted. 40 ml. ether was added and the precipitate was strained well and centrifuged. Repeated washing and centrifugations six times were effected and the product was dried in the damp cake (damp with ether).

Yield: 755 mg. (78%) dried 2 hours at 100°/0.5 mm. 50 mg. of the sulfate product were triturated twice with 3 ml. abs. EtOH, centrifuging each time and decanting, and then twice in ether. Subsequently the product was dried 2 hours at 100°/0.5 mm., then 15 hours at r.t. U.V. spectra: Calc'd as being $C_{20}H_{25}N_7O_6 \cdot 1.3H_2SO_4$ In 2 N HCl:

$$\lambda^{pH\ 0}_{max.\ (m\mu)}\ 277$$

(sh.) ($\epsilon$ 13,900); 275 ($\epsilon$ 17,900)

In 0.1 N HOAc $$\lambda^{pH\ 13}_{max.\ (m\mu)}\ 283$$

($\epsilon$ 17,500)

In 0.1 N HOAc $$\lambda^{pH\ 3.4}_{max.\ (m\mu)}\ 267$$

($\epsilon$ 20,300); 294 (sh.) ($\epsilon$ 9,250)

In 0.1 M tris buffer containing 0.1 M 2-mercaptoethanol $$\lambda^{pH\ 7}_{max.\ (m\mu)}\ 292$$

($\epsilon$ 20,300)

The solution after standing 27 hours had $$\lambda^{pH\ 7}_{max.\ (m\mu)}$$

297 ($\epsilon$ 16,100).

Found: C, 37.87; H, 5.13; S, 7.66; N, 19.34 (hygroscopic redried). Calc'd for $C_{20}H_{25}N_7O_6 \cdot H_2SO_4$: C, 43.1; H, 4.88; N, 17.6; S, 5.75. Calc'd for $$C_{20}H_{25}N_7O_6 \cdot 1.3H_2SO_4$$

C, 41.1; H, 4.75; N, 16.8; S, 6.95.

Example 3

Reduction of homofolic acid.—To a slurry of 25 mg. $PtO_2$ (prereduced) in 1.5 ml. $CF_3COOH$ was added a solution of 215 mg. (0.47 mm.) of homofolic acid:

| Time: | $H_2$ vol. | $H_2$ uptake |
|---|---|---|
| 10:55 | 58.8 | |
| 11:10 | 46.0 | 12.8 |
| 11:30 | 34.4 | 24.4 |
| 11:45 | 33.2 | 25.6 |

The solution was filtered (under $N_2$) to remove catalyst and into a solution of 0.023 ml. $H_2SO_4$ in 1 ml. EtOH (0.4 mm.). The solution was diluted with 10 ml. ether. The solid separated, but was sticky when exposed to air. Ether was added and the product collected on a filter. A sticky ppt. was transferred to a vial and dried, I.V. wt. 178 mg. (68%).

U.V. spectrum in 2 N HCl: $\lambda_{max(m\mu)}$ 226 (sh.) ($\epsilon$ 10,400); 265 ($\epsilon$ 13,100).

In 0.1 N NaOH: $\lambda_{max(m\mu)}$ 283 ($\epsilon$ 13,900)

In 0.1 M HOAc $\lambda_{max(m\mu)}$ 268 ($\epsilon$ 14,800); 292 (sh.) ($\epsilon$ 7,600).

U.V. spectra almost unchanged.

As above, using 55 mg. $PtO_2$ and 500 mg. (1.1 mm.) homofolic acid—theoretical uptake of $H_2$—53.6 ml. Yield of sulfate 615 mg.

Filtered into solution of 3 ml. EtOH containing 0.069 ml. (1.2 mm.) $H_2SO_4$. To the light brown filtrate was added 30 ml. ether, the mixture was cooled and a light brown solid sulfate product was removed by filtration and washed well with ether; tended to become sticky on exposure to air. Dried. Yield: 610 mg. solid (99%).

Calc'd for $C_{20}H_{25}N_7O_6 \cdot H_2SO_4$: C, 43.1; H, 4.88; N, 17.6; S, 5.75. Found (Stanford): C, 39.2; H, 5.02; S, 5.60; N, 13.4 (hygroscopic).

U.V. spectra in 2 N HCl $\lambda_{max(m\mu)}$ 226 ($\epsilon$ 9,360); 226 ($\epsilon$ 12,400).

In 0.1 M NaOH $\lambda_{max(m\mu)}$ 283 ($\epsilon$ 13,500).

In 0.1 M HOAc $\lambda_{max(m\mu)}$ 268 ($\epsilon$ 14,900); 295 ($\epsilon$ 6.44).

We claim:
1. Tetrahydrohomofolic acid sulfate.

References Cited

UNITED STATES PATENTS

| 2,500,296 | 3/1950 | Waller et al. | 260—251 |
| 2,659,726 | 11/1953 | Cosulich | 260—251.5 |
| 2,694,065 | 11/1954 | Cosulich | 260—251.5 |
| 2,729,641 | 1/1956 | Brockman et al. | 260—251.5 |

FOREIGN PATENTS 487,930  11/1952  Canada.

OTHER REFERENCES

Goodman et al., J.A.C.S. 86, 308 (1964).

ALEX MAZEL, Primary Examiner

R. V. RUSH, Assistant Examiner

U.S. Cl. X.R.

260—999